Figure 3:
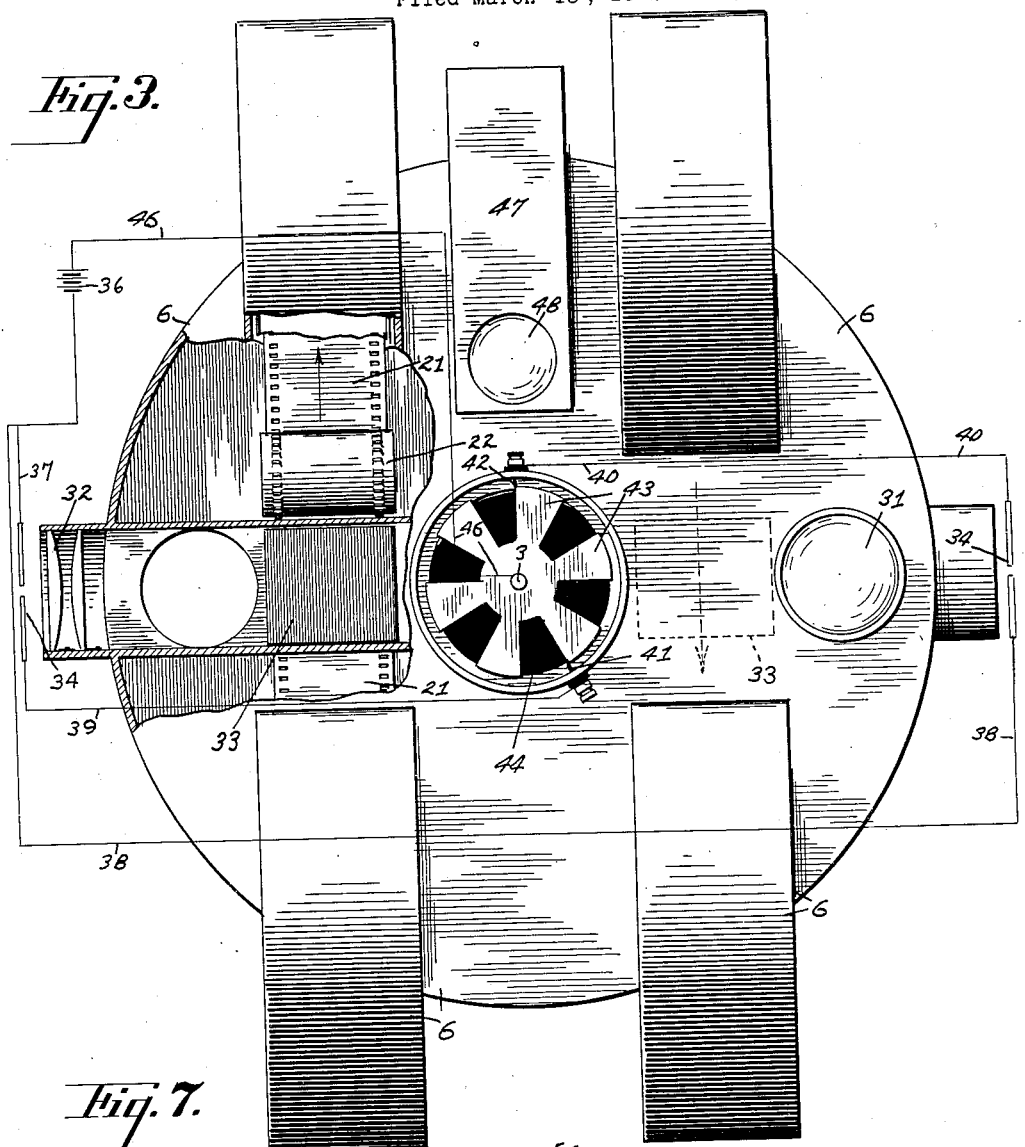

Nov. 4, 1924.  
G. GRIFFITH  
1,513,984  
OPTICAL INSTRUMENT FOR TAKING AND PROJECTING PICTURES  
Filed March 13, 1922  
3 Sheets-Sheet 1
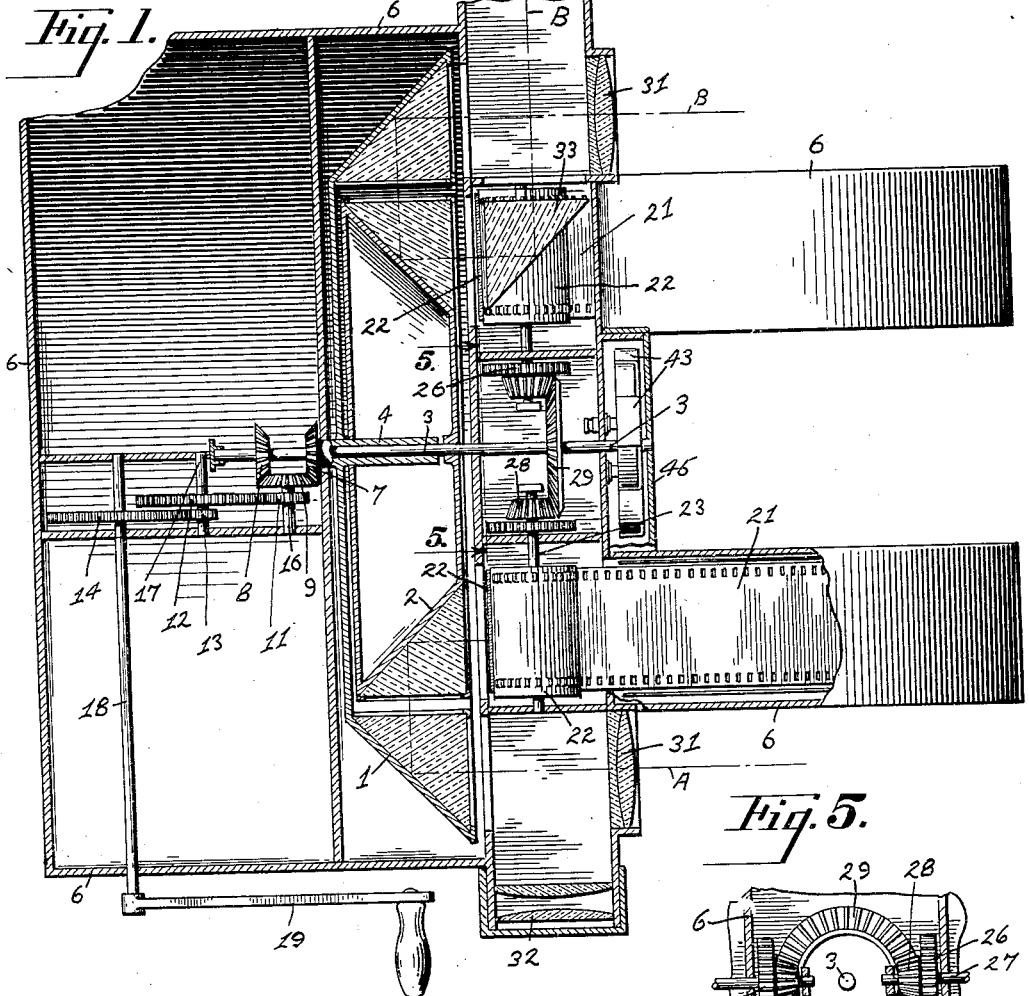
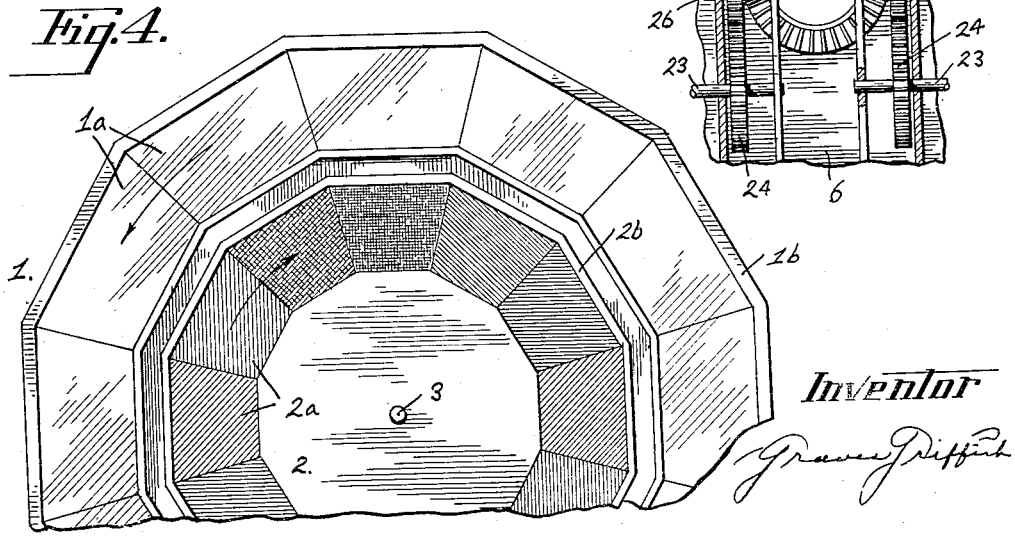
Inventor  
Graves Griffith Nov. 4, 1924.  1,513,984
G. GRIFFITH
OPTICAL INSTRUMENT FOR TAKING AND PROJECTING PICTURES
Filed March 13, 1922  3 Sheets-Sheet 2
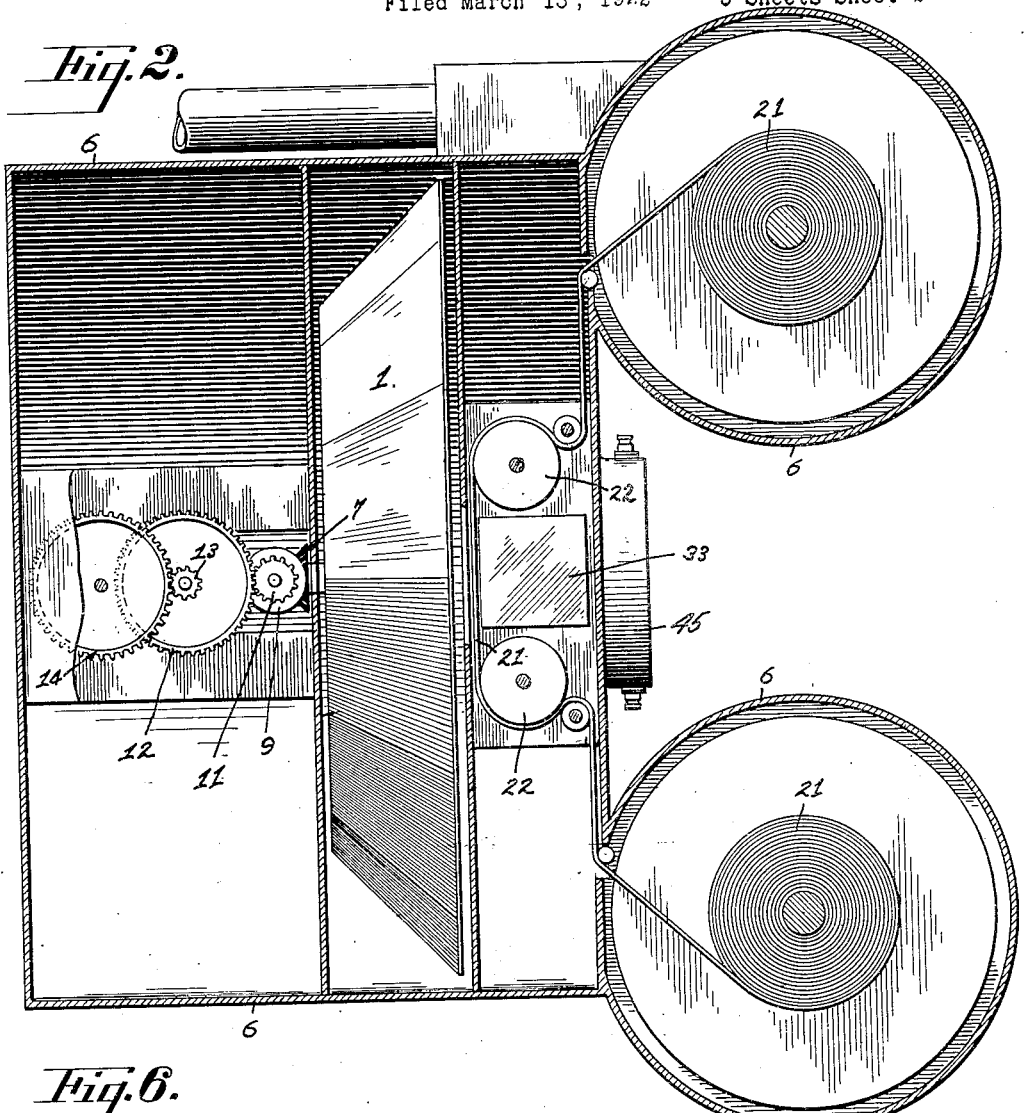
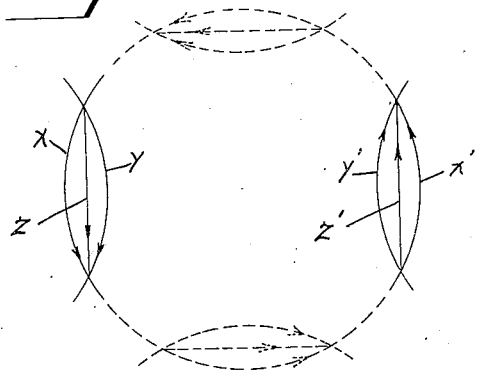
Inventor Nov. 4, 1924.
G. GRIFFITH
1,513,984
OPTICAL INSTRUMENT FOR TAKING AND PROJECTING PICTURES
Filed March 13, 1922    3 Sheets-Sheet 3

Inventor
Grannes Griffith.

Patented Nov. 4, 1924.

1,513,984

UNITED STATES PATENT OFFICE.

GRAVES GRIFFITH, OF SAN FRANCISCO, CALIFORNIA.

OPTICAL INSTRUMENT FOR TAKING AND PROJECTING PICTURES.

Application filed March 13, 1922. Serial No. 543,285.

*To all whom it may concern:*

Be it known that I, GRAVES GRIFFITH, a citizen of the United States, residing in the city and county of San Francisco and State of California, have invented certain new and useful Improvements in Optical Instruments for Taking and Projecting Pictures, of which the following is a specification.

The present invention relates to combination instruments for taking and projecting pictures and more particularly to that type using a continuously moving film, and has as a principal object the provision of optical means whereby pictures are produced simultaneously upon corresponding sections of duplicate and continuously moving films, and the positives thereof projected in like manner, or in alternate, for the creation of stereoscopic effect.

In the accompanying drawings, forming a part of this specification, similar reference characters designate similar parts, throughout.

Figure 7:
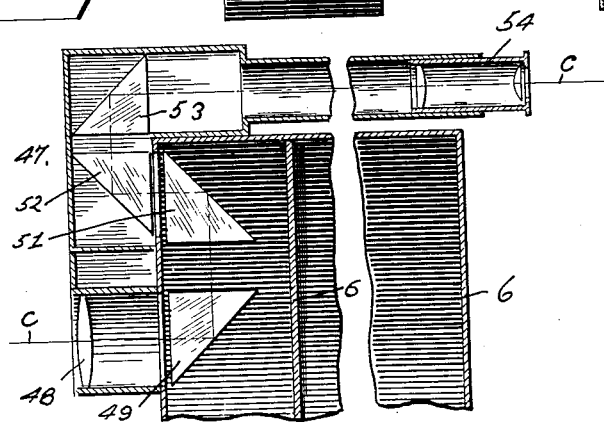

Figure 1 is a horizontal section; Figure 2 is a vertical section; Figure 3 is a front elevation; Figure 4 is a front elevation of reflective system; Figure 5 is a detail, on 5—5, of the film-moving gears; Figure 6 is a diagram of image-path, and Figure 7 is a section of the view-finder.

The device comprises an outer series of reflective units 1ª mounted in a revoluble frame 1 carrying a sleeve 4 bearing a crown-gear 7, the reflective surfaces of the units being so disposed as to direct the reflected rays in the direction of the axis of rotation; an inner series of reflective units 2ª mounted in a revoluble frame 2 borne by a shaft 3 bearing a crown-gear 8, the movement being the opposite of that of frame 1 and the reflective surfaces of the reflective units so disposed as to direct the reflections received outwardly, in the direction of their origin; a housing 6; a driving mechanism comprising a gear-train 9, 11, 12, 13, 14 borne by shafts 16, 17, 18 and actuated by a means 19; spaced and diametrically disposed objectives 31; duplicate films 21 arranged for simultaneous movement in opposite directions; a duplicate film-moving mechanism comprising, respectively, gear-trains 24, 26, 28 borne by shafts 23, 27 and having a common crown-gear 29 carried by the shaft 3 for their actuation; duplicate condenser elements 32 diametrically arranged in co-axial alignment and co-operatively associated, respectively, with duplicate reflective elements 33; an electric system, in duplicate, for illumination, comprising an energizing source 36, duplicate conductive means consisting of elements 37, 34, 39 and 38, 34, 40 leading therefrom and connecting, respectively, with terminals and brushes 41, 42, a return conductive means 46, a means for current control consisting of a rotary device having segmentally arranged conductive and non-conductive elements 43, 44; and a view-finder comprising a housing 47, an objective 48 co-operatively associated, at a fixed point, with successively presented reflective units 49 of the series 2ª, reflective elements 52, 53, co-operatively associated, at a fixed point, with successively presented units 51 of the series 1ª, units of the one series being so arranged as to co-operate with corresponding units of the other series, and an ocular 54.

The two series of annularly disposed reflective units are concentrically arranged, having the reflective surfaces of the units comprising the one right-angularly opposed to the reflective surfaces of the corresponding units comprising .the other. The images reflected, respectively, by these corresponding units describe a curvilinear course in the direction of rotation of these reflective units, with inversion of images taking place in the same direction. To correct both curvilinear courses and inversion of images, changing the one to a rectilinear course, and the other to a maintained image erection, the two series of reflective units are rotated, simultaneously, in opposite directions at equal speed and in a common plane about a common axis. This property of opposed reflective action is illustrated in diagraphic manner in Figure 6, wherein the curvilinear courses are designated by $x$, $y$ and $x'$ $y'$, and the rectilinear by $z$ and $z'$.

Color screens are shown as being borne by the emergent faces of the inner of the two series of prism units, but these may as properly be borne by either the receiving or the emergent faces of the prism units of either of the two series and may be of the usual series of two or three colors, or of the usual order of arrangement of the prismatic colors. However borne and whatever their arrangement, a convenient means is thereby provided for taking and projecting pictures in colors. Here, as in other types of instruments directed to the attainment of this object, reliance for effect is placed upon persistence of vision.

The arrangement of the optical and film features renders the instrument particularly well adapted to the simultaneous production of pictures at spaced points and the projection of such simultaneously taken pictures in sequence, by the advancement of one film one picture beyond its corresponding picture of the other film, a process increasing the stereoscopic effect, as well as the color, through doubling the time of the retinal impression.

No means have been shown for masking the condensers 32 and associate prism elements 33, nor for the movement of the objectives 31 about vertical axes, as these are considered matters of constructional detail whose introduction would only serve to render less plain the drawings.

The means for illumination, in projecting, is of the usual arc 34, in duplicate, and electric circuit type connecting with a battery 36, or other energizing source, and arranged for the alternate illumination of opposite sections of a pair of continuously moving films 21, the illumination continuing, as here provided, through a thirty-degree movement, respectively, of the two series of reflective units 1ª and 2ª and controlled by a rotary make-and-break provided with insulated and non-insulated sectors 44 and 43 of, respectively, thirty-degree extent and borne by shaft 3.

The rectilinear movement of the films are in synchronized accord with the rectilinear movement of the images, both being geared and gauged for equal speed in a common direction, as applied to those of either side of the instrument.

For reflective units comprising respectively the two series, the ninety-degree prism form, fitted and contiguously arranged as segmental parts of the circle and secured in place on their respective frames 1 and 2 by flanges 1ᵇ and 2ᵇ carried respectively thereby, is preferred.

Operatively considered, the instrument is intended to function in duplicate, though either side may be made to function independently of the other by properly masking certain of its duplicated optical features. The course of the light-rays for one side, in the taking process, is indicated by the broken line A; that, of the projecting, by B.

Having thus described my invention, I claim:

1. In an apparatus of the character described, the combination with means for continuously moving a film, of concentrically mounted spaced elements having reflecting surfaces at right angles to each other and cooperating to direct light upon said film, and means for rotating said reflectors in opposite directions about their common center.

2. In an instrument of the character described, the combination with a continuously moving film feed of two oppositely rotating concentrically disposed reflective members arranged to direct rays of light upon the film, said reflective members comprised respectively of a multiple of reflective units circularly and contiguously disposed and having the reflective faces of the units comprising one of said members right-angularly opposed to the reflective faces of the corresponding units comprising the other of said members, and means for directing rays of light upon the reflective faces of the units comprising one of the said reflective members.

3. In an instrument of the character described, the combination with an objective directing beams of light, a continuously moving film, and oppositely rotative and concentrically arranged reflective members, comprised, respectively, of prism elements circularly and contiguously disposed, the reflective faces of the elements comprising one of said members being right-angularly opposed to the reflective faces of the corresponding elements comprising the other of said members, rotating in the path of said beams and causing them to undergo a double reflection to direct them upon said film.

4. In an instrument of the character described, the combination with an objective for transmitting rays of light, a continuously moving film, and means, comprising two oppositely rotating and concentrically arranged reflective members in the path of the rays of light from the objective comprised respectively of a series of circularly and contiguously disposed reflective units having the reflective faces of the units of the one series right-angularly opposed to the corresponding faces of the units of the other series, for directing the said rays of light upon the said film in correspondence with the movement thereof to cause a fixed relation to be maintained between the film and the rays of light during the movement of the film.

5. In an instrument of the character described, the combination with a continuously moving film feed, of two oppositely rotating and concentrically arranged reflective members, each having a plurality of prism units circularly and contiguously disposed, the reflective faces of the prism units of the one member being right-angularly opposed to the reflective faces of the corresponding prism units of the other member, light directing means, said means cooperating with said two rotating reflective members to direct rays of light upon the film, and means whereby a fixed and constant relationship is maintained between the film and the rays of light directed thereupon during the movement of the film.

6. In an instrument of the character described, the combination with a film and a continuous feed therefor, of a pair of concentrically arranged reflective members, each comprised of a series of circularly and contiguously disposed prism units and having the reflective faces of the prism units comprising one of said reflective members right-angularly opposed to the reflective faces of the prism units comprising the other of said members and mounted to rotate at equal speed in opposite directions in accordance with the movement of said film, an objective cooperating with the pair of said reflective members whereby light rays may be directed upon the film, and a means for synchronizing the movement of said film and said pair of reflective members and establishing therebetween a fixed and maintained relationship.

7. In an instrument of the character described, the combination of an objective, a pair of concentrically arranged rotative reflective members in co-operative association therewith, comprised, respectively, of a plurality of circularly and contiguously disposed prism units, having the reflective surfaces of the prism units of the one member right-angularly opposed to the reflective surfaces of the corresponding prism units of the other member and arranged to direct the rays of light transmitted by said objective upon a film, a continuous feed for said film, gearing adapted to rotate said reflective members at equal speed in opposite directions and in a common plane about a common axis and effect the feed of said film, the speed of the said film and the speed of the said pair of reflective members being so correlated as to produce a fixed image upon the continuously moving film, and color screens for certain of the non-reflective surfaces of the prism units comprising one of said pair of reflective members.

8. In an instrument of the character described, the combination with duplicate continuously and oppositely moving film feeds, of two oppositely rotating and concentrically arranged reflective members adapted to direct rays of light upon the films, said reflective members comprising a series of circularly and contiguously disposed prism units, the reflective surfaces of the units comprising one of said members being right-angularly opposed to the reflective surfaces of the corresponding units comprising the other of said members, and duplicate means for directing rays of light from spaced points upon the reflective surfaces of diametrically opposite prism units of one of said members.

9. In an instrument of the character described, the combination with a continuously moving film feed adapted to move a pair of films in opposite directions, of two oppositely rotating and concentrically arranged reflective members adapted to direct rays of light upon the films, said reflective members comprising a series of circularly and contiguously arranged prism units, the reflective surfaces of the units comprising one of said reflective members being right-angularly opposed to the reflective surfaces of the corresponding prism units of the other of said reflective members, duplicate objectives positioned to direct rays of light from spaced points upon the reflective surfaces of diametrically opposite prism units of one of said reflective members.

10. In an instrument of the character described, the combination of duplicate films and duplicate feeds therefor, of duplicate, oppositely rotating and concentrically arranged reflective members, each of said members being comprised of a series of circularly and contiguously disposed prism units, the reflective surfaces of the units comprising one of said members being right-angularly opposed to the reflective surfaces of the prism units comprising the other of said members, duplicate objectives positioned to direct, respectively, rays of light from spaced points upon the reflective surfaces of diametrically opposite prism units of one of the said two reflective members, by which the said rays are reflected to the corresponding prism units of the other of said reflective members and from thence, respectively, to said films, gearing adapted to rotate said reflective members in opposite directions at equal speed and in a common plane about a common axis and effect the feed of said films in opposite direction, the speed of the said reflective members and the speed of the said films being so correlated as to produce fixed images upon the continuously moving films, and color screens borne by the non-reflective faces of certain of said prism units to present colored lights to said moving films.

11. In an instrument of the character described, the combination with a continuously moving film, of a fixed source of light, means for directing the light emanating from said source through said film, concentrically arranged and oppositely rotating reflective members in co-operative association with said film for directing the light received therethrough to an objective, an objective, and a mechanism adapted to rotate reflective members in opposite directions and effect the feed of said film, the feed of the film and the speed of rotation of the said reflective members being so correlated as to effect the projection of a fixed moving picture from the continuously moving film.

12. In an instrument of the character described, the combination with duplicate films and duplicate feeds therefor, of duplicate stationary light sources, duplicate means for directing the light emanating from said sources through said films, a pair of rotative concentrically arranged reflective members comprised, respectively, of prism units circularly and contiguously disposed and having the reflective faces of the units of the one member right-angularly opposed to the reflective faces of the corresponding units of the other member, in co-operative association with both of said duplicate films and operating to reflect the light received, respectively, through said films to spaced objectives, and a gearing adapted to rotate the members constituting the said pair at equal speed in opposite directions and effect the feed of said films in opposite directions, the feed of said films and the speed of rotation of said reflective members being so correlated as to effect the projection of a fixed moving picture from each of the continuously moving films.

13. In an instrument of the class described, the combination with means for continuously moving duplicate films, of a plurality of reflectors disposed about a common axis in light directing relation with respect to said films, the reflecting surfaces of said reflectors being in angularly opposed relation to each other, and means whereby said reflectors are rotated in opposite directions about the common axis.

14. In an instrument of the character described, the combination with a pair of light sources, of reflectors provided with reflecting surfaces at right angles to each other, means for rotating said reflectors in opposite directions about a common axis in a common plane, a pair of films between said light sources and said reflectors, means for moving said films in synchronism with the rotation of said reflectors, and spaced objectives disposed in cooperative relation with diametrically spaced portions of one of said reflectors.

15. In an instrument of the character described, the combination with duplicate sources of light, of a rotary electric contact adapted to control in alternation the said sources of light, duplicate continuously moving films arranged to receive light, respectively, from the said sources, and duplicate means for directing light from said sources of light through said films.

16. In an instrument of the character described, the combination with duplicate stationary sources of light, of duplicate condenser elements, spaced reflective elements and oppositely continuously moving film feeds, said condenser and reflective elements arranged to direct light from said sources through the films, duplicate rotating reflective bodies, each being comprised of a series of circularly and contiguously disposed prism units of the ninety-degree type with the reflective faces of the units comprising one of said bodies right-angularly opposed to the reflective faces of the corresponding units of the other of said bodies, the said bodies being concentrically mounted for rotation in opposite directions at a common speed about a common axis in a common plane and operating to receive the light after passage through said films spaced duplicate objectives arranged to receive the light from said bodies, a rotating electric contacting member so actuated as to control in alternation the light in its passage from the said sources to said films, and gearing adapted to synchronize the movements of said films, said contacting member and said reflective bodies and so correlate their respective speed as to effect the projection in alternation of a fixed moving picture from said continuously moving films.

17. In an instrument of the character described, moving films, sources of light, means for passing light from said sources through said films, reflective bodies comprised respectively of a series of circularly and contiguously disposed ninety-degree prisms having the reflective surfaces of the prisms of one series right-angularly opposed to the reflective surfaces of the prisms of the other series, means for rotating said bodies in opposite directions at a common speed and about a common axis in a common plane and in reflective association with each other, one of said series of prisms operating to receive the light emanating from said sources after its passage through said films, spaced objectives arranged, respectively, for co-operative association with diametrically opposite prisms in one of said series, prismatic color screens borne by the entrant faces of the prisms constituting one of said series for presenting the prismatic colors in sequence to said films, a rotating electric contacting device for the control, in alternation, of the light in its passages from the said sources to said films, and gearing for the actuation of the said films, the said contacting device and the said reflective bodies, and adapted to so correlate the speed of these three different elements as to effect the projection, in alternation, of a fixed moving picture from each of said continuously moving films.

18. In an instrument of the character described, the combination with a pair of moving films, of a pair of concentrically arranged reflectors disposed in light receiving relation to said film, said reflectors comprising opposed reflecting surfaces at right angles to each other, means for rotating said reflectors in opposite directions about a common center, and a view finder for said films, said finder comprising reflectors arranged to receive light from one of said reflective surfaces.

19. In an instrument of the class described, the combination of spaced objectives, concentrically arranged reflectors, a pair of continuous films, means for rotating said reflectors in opposite directions, means for continuously moving said films, and mechanical means for synchronizing the movement of said films and the rotation of said reflectors, whereby said films are simultaneously exposed through said objectives, and a fixed view finder in light receiving relation to said reflectors.

GRAVES GRIFFITH.